Patented Feb. 15, 1938

2,108,438

UNITED STATES PATENT OFFICE 2,108,438

PROCESS OF TREATING HYDROCARBON VAPORS WITH ZINC CHLORIDE

Franklin E. Kimball, Los Angeles, Calif.

No Drawing. Application July 21, 1936,
Serial No. 91,788

9 Claims. (Cl. 196—36)

This invention relates to processes of treating hydrocarbon vapors with zinc chloride and has for its object to render more expeditious and cheaper the application of said processes by employing the use of a fused maintained treating-mixture containing sufficient zinc chloride to prevent separation of ammonium chloride and sufficient ammonium chloride to prevent separation of zinc chloride at a temperature between 355 degrees Fahrenheit and zinc chloride melting-temperature.

Considerably above 355 degrees Fahrenheit approximately the same degree of heat melts zinc chloride as decomposes ammonium chloride. Ammonium chloride does not melt with heat but it decomposes with heat. Solid ammonium chloride exists only in the form of needle-like crystals which pack down and form the interstices too small to conduct the hydrocarbon vapors through the ammonium chloride with a practical velocity. At a temperature of 355 degrees Fahrenheit a mixture of three parts of zinc chloride and one part of ammonium chloride liquefies.

I pass hydrocarbon vapors containing hydrogen sulphide and gum-forming vapors at a temperature between 355 and 487 degrees Fahrenheit beneath the surface of a fused maintained treating-mixture containing approximately three parts of zinc chloride to prevent separation of ammonium chloride and one part of ammonium chloride to prevent separation of zinc chloride, supply to the treating-mixture a fused mixture of chlorides of zinc and ammonium, separate and withdraw the vapors from the treating-mixture, withdraw from the treating-mixture a fused mixture of chlorides of zinc and ammonium containing products of reaction, supply ammonia to the withdrawn vapors, pass the ammonical vapors beneath the surface of a maintained aqueous solution of calcium chloride, supply to the aqueous solution of calcium chloride water and calcium chloride, separate and withdraw the vapors from the aqueous solution of calcium chloride and withdraw from the aqueous solution of calcium chloride water and calcium chloride admixed with condensed gum-containing hydrocarbon liquid. I remove gum-forming vapors from hydrocarbon vapors by effecting a catalytic polymerization of the gum-forming vapors to form gums, by partially cooling and partially condensing the hyrocarbon vapors to form a condensed gum-containing hydrocarbon liquid, by separating and withdrawing the hydrocarbon vapors from the condensed gum-containing hydrocarbon liquid and by withdrawing the condensed gum-containing hydrocarbon liquid.

I will hereinbelow describe a preferred embodiment of my improvements in processes of treating hydrocarbon vapors with fused zinc chloride. The description is an example of an illustration portraying my improvements. It is to be understood that my invention is not limited nor restricted to the employment of the use of the precise mixtures, concentrations, quantities, proportions, pressures nor temperatures whose use are employed in the operation of such an illustrative process as is thus hereinbelow described as being a practical example of an application which portrays my improvements.

In the application of such an illustrative process, mineral oil may be continuously supplied to a suiable heater and continuously cracked under pressure by processes well-known to those skilled in the art of manufacturing gasoline. From sulphur bearing oils, hydrocarbon vapors containing hydrogen sulphide may be continuously formed. The vapors may then be continuously separated from unvaporized residue. The vapors may then be continuously partially dephlegmated. At a pressure between 50 and 100 pounds per square inch gage pressure, the vapors may then be continuously further partially cooled and partially condensed to such a degree that the vapors may be continuously withdrawn from the dephlegmation vessel at a temperature between 355 and 487 degrees Fahrenheit.

The pressures of the application of the treatment of the hydrocarbon vapors may be controlled by employing the use of suitable pressure regulators such as are well-known to those skilled in the art of treating hydrocarbon vapors. Prior to the entry of the vapors into the primary bubble-tower, the pressure may be stepped down from the pressure between 50 to 100 pounds per square inch gage pressure, for the making of a subjection of the vapors to a polymerization treatment while they exist in superheated condition at a pressure between 10 and 15 pounds per square inch gage pressure. Thereupon, polymerized products may be readily held in the vapor phase because the temperature is still yet above the temperature of their condensation under the pressure whose use is being employed in making the application of the treatment. Again, subsequently to the exit of the vapors from the primary bubble-tower, the pressure may be stepped down to a pressure between 5 and 10 pounds per square inch gage pressure for the making of a subjection of the vapors to a subsequent treatment for removing reaction products from the vapors with a secondary bubble-tower.

At the temperature between 355 and 487 degrees Fahrenheit and the pressure between 10 and 15 pounds per square inch gage pressure, the withdrawn hydrocarbon vapors may then be continuously passed into the bottom of a suitable primary bubble-tower and may be continuously withdrawn from it at the top thereof. A fused mixture of one part of ammonium chloride and three parts of zinc chloride may then be continuously passed into the top of the primary bubble-tower and may be continuously withdrawn from it at the bottom thereof. Within the primary bubble-tower the vapors are brought into contact with the primary treating-mixture by bubbling therethrough in a series of superimposed pans such as are well-known to those skilled in the art of treating hydrocarbon vapors. The vapors, from off of the top of each pan below, pass into the pan above at a point beneath the surface of the liquid therein. The treating-mixture, from off of the top of each pan above, passes into the pan below at a point beneath the surface of the liquid therein. Thereupon the vapors become desiccated by the lower pans.

The treating of the hydrocarbon vapors in the primary bubble-tower may be controlled by manipulations of the amounts of ammonium chloride and of zinc chloride being passed into the top. It is aimed to supply one pound of ammonium chloride and three pounds of zinc chloride for each barrel of gasoline being supplied for treatment. By manipulations of the amounts of the two ingredients of the fused treating-mixture being supplied to the top of the primary bubble-tower, the resulting composition of the treating-mixture which is being withdrawn from the bottom of the primary bubble-tower is thereby carefully maintained at a proportion of approximately 25% of ammonium chloride to 75% of zinc chloride. The temperature of the treating of the vapors in the primary bubble-tower may be controlled by manipulations of the amounts and temperatures of the vapors and treating-mixtures being supplied. Thereby, the temperature of the treating-mixture being withdrawn from the bottom of the primary bubble-tower may be carefully maintained at a temperature between 355 and 487 degrees Fahrenheit.

The primary bubble-tower may be constructed of acid-proof materials such as are well-known to those skilled in the art of treating hydrocarbon vapors with zinc chloride.

Gaseous ammonia may then be supplied to the hydrocarbon vapors which have been withdrawn from the primary bubble-tower. Sufficient quantities may be supplied to render the vapors slightly ammoniacal.

The ammoniacal hydrocarbon vapors may then be continuously supplied to the bottom of the secondary bubble-tower and continuously withdrawn from it at the top thereof. Aqueous solutions of calcium chloride may then be continuously passed into the top of the said secondary bubble-tower and may be continuously withdrawn from it at the bottom thereof. Within the secondary bubble-tower the vapors may be brought into contact with the aqueous calcium chloride solution by bubbling therethrough in a series of superimposed pans such as are well-known to those skilled in the art of treating hydrocarbon vapors. The vapors, from off of the top of each pan below, pass into the pan above at a point beneath the surface of the liquid therein. The calcium chloride solution, from off of the top of each pan above, passes into the pan below at a point beneath the surface of the liquid therein. The calcium chloride solution partially cools and partially condenses the vapors thereby forming hydrocarbon liquid containing gums. The vapors generate steam from the aqueous calcium chloride solution thereby facilitating the maintaining of the gasoline hydrocarbons in the vapor phase. The calcium chloride solution also extracts ammonium chloride from the vapors. The condensed hydrocarbon liquid also extracts from the vapors gums that are resultant of zinc chloride catalysis in the primary treatment. Both liquids may be continuously withdrawn from the bottom of the secondary bubble-tower.

The treating of the hydrocarbon vapors in the secondary bubble-tower may be controlled by manipulations of the amounts of the ingredients of the solutions that are being supplied to the top of the secondary bubble-tower. It is aimed to supply approximately twenty pounds of calcium chloride in aqueous solution for each barrel of gasoline that is being supplied for treatment. This is in order to flush away adequately the condensing hydrocarbon liquid. Additional amounts of water may also be supplied in the calcium chloride solution in such quantities as are sufficient to offset such amounts of water as may be vaporized in the application of the treatment. By the manipulations of the amounts of both ingredients of the solutions being supplied to the top of the secondary bubble-tower, the resulting composition of the aqueous calcium chloride solution which is being withdrawn from the bottom of the secondary bubble-tower may be carefully maintained within the proportions of 35 to 45 per cent of water and 50 to 60 per cent of calcium chloride. The temperature of this exit flow of calcium chloride solution may also be carefully maintained at a temperature between 275 and 325 degrees Fahrenheit by means of manipulations of the temperatures and pressures of the vapors which may be supplied for a subjection to an aqueous calcium chloride treatment.

The withdrawn hydrocarbon vapors from off of the top of the secondary bubble-tower may then be continuously cooled and condensed thereby forming gasoline.

The condensed gasoline may then be further treated with fifty degree Baumé sulphuric acid, an aqueous solution of caustic soda and an aqueous solution of sodium plumbite by processes well-known to those skilled in the art of manufacturing gasoline from sulphur bearing mineral oil.

Although I have hereinabove shown and described only one process of refining gasoline embodying my invention, it is to be understood that various changes and modifications may be made in making the application of my improvements in processes of treating hydrocarbon vapors without departing from the spirit of the invention and the spirit and scope of the appended claims.

I claim:

1. In the refining of hydrocarbon oils, at a temperature below zinc chloride fusion-temperature the step which comprises treating the oil in the vapor phase, at a temperature above 355 degrees Fahrenheit, with a fused maintained treating-mixture containing approximately one part of ammonium chloride to prevent separation of zinc chloride and three parts of zinc chloride to prevent separation of ammonium chloride.

2. In the refining of hydrocarbon oils, at a temperature below zinc chloride fusion-temperature, the step which comprises treating the oil in the vapor phase, at a temperature above 355 degrees Fahrenheit, with a fused maintained treating-mixture containing sufficient ammonium chloride to prevent separation of zinc chloride and sufficient zinc chloride to prevent separation of ammonium chloride.

3. In the refining of hydrocarbon vapors, at a temperature between 355 degrees Fahrenheit and zinc chloride fusion-temperature, the step which comprises passing the vapors beneath the surface of a fused maintained treating-mixture containing sufficient ammonium chloride to prevent separation of zinc chloride and sufficient zinc chloride to prevent separation of ammonium chloride.

4. A process comprising passing hydrocarbon vapors at a temperature between 355 and 487 degrees Fahrenheit beneath the surface of a fused maintained treating-mixture containing approximately three parts of zinc chloride to prevent separation of ammonium chloride and one part of ammonium chloride to prevent separation of zinc chloride, supplying to the treating-mixture a fused mixture of chlorides of zinc and ammonium, separating and withdrawing the vapors from the treating-mixture, withdrawing from the treating-mixture a fused mixture of chlorides of zinc and ammonium containing products of reaction, partially cooling and partially condensing the withdrawn vapors, separating and withdrawing the partially cooled vapors from the condensed hydrocarbon liquid and withdrawing the condensed hydrocarbon liquid.

5. A process comprising passing hydrocarbon vapors containing gum-forming vapors at a temperature between 355 and 487 degrees Fahrenheit beneath the surface of a fused maintained treating-mixture containing approximately three parts of zinc chloride to prevent separation of ammonium chloride and one part of ammonium chloride to prevent separation of zinc chloride, supplying to the treating-mixture a fused mixture of chlorides of zinc and ammonium, separating and withdrawing the vapors from the treating-mixture, withdrawing from the treating-mixture a fused mixture of chlorides of zinc and ammonium containing products of reaction, partially cooling and partially condensing the withdrawn vapors, separating and withdrawing the partially cooled vapors from the condensed gum-containing hydrocarbon liquid and withdrawing the condensed gum-containing hydrocarbon liquid.

6. A process comprising passing hydrocarbon vapors containing hydrogen sulphide and gum-forming vapors at a temperature between 355 and 487 degrees Fahrenheit beneath the surface of a fused maintained treating-mixture containing approximately three parts of zinc chloride to prevent separation of ammonium chloride and one part of ammonium chloride to prevent separation of zinc chloride, supplying to the treating-mixture a fused mixture of chlorides of zinc and ammonium, separating and withdrawing the vapors from the treating-mixture, withdrawing from the treating-mixture a fused mixture of chlorides of zinc and ammonium containing products of reaction, supplying ammonia to the withdrawn vapors, partially cooling and partially condensing the ammoniacal vapors, separating and withdrawing the partially cooled vapors from the condensed gum-containing hydrocarbon liquid and withdrawing the condensed gum-containing hydrocarbon liquid.

7. A process comprising passing hydrocarbon vapors at a temperature between 355 and 487 degrees Fahrenheit beneath the surface of a fused maintained treating-mixture containing approximately three parts of zinc chloride to prevent separation of ammonium chloride and one part of ammonium chloride to prevent separation of zinc chloride, supplying to the treating-mixture a fused mixture of chlorides of zinc and ammonium, separating and withdrawing the vapors from the treating-mixture, withdrawing from the treating-mixture a fused mixture of chlorides of zinc and ammonium containing products of reaction, passing the withdrawn vapors beneath the surface of a maintained aqueous solution of calcium chloride, supplying to the aqueous solution of calcium chloride water and calcium chloride, separating and withdrawing the vapors from the aqueous solution of calcium chloride and withdrawing from the aqueous solution of calcium chloride water and calcium chloride admixed with condensed hydrocarbon liquid.

8. A process comprising passing hydrocarbon vapors containing gum-forming vapors at a temperature between 355 and 487 degrees Fahrenheit beneath the surface of a fused maintained treating-mixture containing approximately three parts of zinc chloride to prevent separation of ammonium chloride and one part of ammonium chloride to prevent separation of zinc chloride, supplying to the treating-mixture a fused mixture of chlorides of zinc and ammonium, separating and withdrawing the vapors from the treating-mixture, withdrawing from the treating-mixture a fused mixture of chlorides of zinc and ammonium containing products of reaction, passing the withdrawn vapors beneath the surface of a maintained aqueous solution of calcium chloride, supplying to the aqueous solution of calcium chloride water and calcium chloride, separating and withdrawing the vapors from the aqueous solution of calcium chloride and withdrawing from the aqueous solution of calcium chloride water and calcium chloride admixed with condensed gum-containing hydrocarbon liquid.

9. A process comprising passing hydrocarbon vapors containing hydrogen sulphide and gum-forming vapors at a temperature between 355 and 487 degrees Fahrenheit beneath the surface of a fused maintained treating-mixture containing approximately three parts of zinc chloride to prevent separation of ammonium chloride and one part of ammonium chloride to prevent separation of zinc chloride, supplying to the treating-mixture fused mixture of chlorides of zinc and ammonium, separating and withdrawing the vapors from the treating-mixture, withdrawing from the treating-mixture fused mixture of chlorides of zinc and ammonium containing products of reaction, supplying ammonia to the withdrawn vapors, passing the ammoniacal vapors beneath the surface of a maintained aqueous solution of calcium chloride, supplying to the aqueous solution of calcium chloride water and calcium chloride, separating and withdrawing the vapors from the aqueous solution of calcium chloride and withdrawing from the aqueous solution of calcium chloride water and calcium chloride admixed with condensed gum-containing hydrocarbon liquid.

FRANKLIN E. KIMBALL.